United States Patent Office 3,842,086
Patented Oct. 15, 1974

3,842,086
PROCESS FOR THE PREPARATION OF SUBSTITUTED OR UNSUBSTITUTED PYRIDINES
Robert E. Manning, Mountain Lakes, N.J., assignor to Sandoz-Wander, Inc., Hanover, N.J.
No Drawing. Continuation-in-part of abandoned application Ser. No. 115,825, Feb. 16, 1971. This application Sept. 18, 1972, Ser. No. 289,816
Int. Cl. C07d 29/38
U.S. Cl. 260—290 H                     6 Claims

ABSTRACT OF THE DISCLOSURE

Substituted or unsubstituted pyridines, e.g., 4-methyl-1,2,3,6-tetrahydropyridine, are prepared by treating an N-benzyloxy-substituted or unsubstituted pyridinium salt with an alkali metal borohydride. The resulting compounds are useful for the preparation of known pharmaceutically active compounds.

---

This is a continuation-in-part of copending U.S. patent application Ser. No. 115,825 filed Feb. 16, 1971, now abandoned.

This invention relates to processes for the preparation of known substituted or unsubstituted pyridines and the acid addition salts thereof. The substituted or unsubstituted pyridines prepared by the processes of this invention may be represented by the following structural formula:

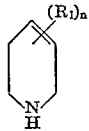
(I)

where each $R_1$ is independently lower alkyl having 1 to 6 carbon atoms, e.g., methyl, ethyl, propyl, isopropyl, butyl, isobutyl, pentyl, isopentyl, hexyl or isohexyl; and $n$ is 0, 1, 2 or 3.

The process for preparing compounds of formula (I) may be generally represented by the following reaction scheme:

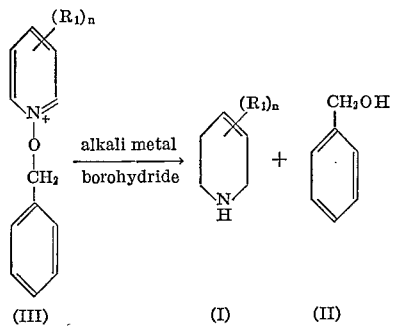

wherein $R_1$ and $n$ have the above-stated significance.

The compounds of formula (I) are prepared by treating an N-benzyloxy-substituted or unsubstituted pyridinium salt, e.g., a halide, with an alkali metal borohydride, e.g., sodium potassium or lithium borohydride, in the presence of an inert hydroxylic solvent. Solvents which may be employed include the lower alcohols, e.g. methanol, ethanol and the like, glycols such as ethylene glycol, propylene glycol and the like, glyme, di-glyme or water, the latter being especially preferred.

The reaction may be carried out at temperatures from about −15° to 60° C., preferably 0° to 25° C. for about 10 minutes to about 2 hours, preferably from about 15 minutes to about 45 minutes. Neither the reaction temperature or time of the reaction are critical.

The compounds of formula (I) may be recovered using conventional techniques, e.g., crystallization.

Certain of the compounds of formula (III) are known and may be prepared by methods disclosed in the literature. Those compounds of formula (III) which have not been specifically disclosed may be prepared by analogous methods from known materials.

The compounds of formula (I) may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of formula (I) as indicated above are known and are useful as intermediates in the preparation of pharmaceutically active compounds of the formula

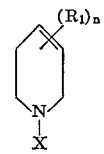
(IV)

where $R_1$ and $n$ have the above-stated significance, and X represents, for example

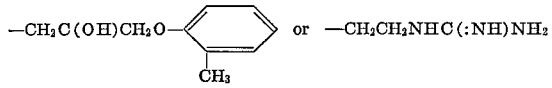

[See C.A. 52 11836 (1958), Merck Index, p. 1058, 8th Ed., and C.A. 63, 586,587 (1965).]

EXAMPLE 1

(A) 1,2,3,6-tetrahydropyridine hydrochloride: A solution of N-benzyloxypyridinium bromide (5.0 g.) in water (75 ml.) cooled in an ice bath is treated with solid sodium borohydride (1.5 g.) and is stirred in several portions over a few minutes. The resultant mixture is then stirred for 30 minutes and treated with 6N hydrochloric acid until acidic and then ether is added. The ether layer, which contains benzyl alcohol, is removed and the aqueous phase is made basic with 50% sodium hydroxide solution and extracted several times with methylene chloride. The combined methylene chloride extracts are dried over anhydrous sodium sulfate and then treated with excess dry hydrogen chloride gas. The resultant mixture is evaporated in vacuo and the residue crystallized from ethanol-ether (1:4) to give the product, 1,2,3,6-tetrahydropyridine hydrochloride, m.p. 190°–192° C.

(B) Following the procedure of Step A and in place of N-benzyloxypyridinium bromide, starting with N-benzyloxy-2-methylpyridinium bromide, there is obtained 2-methyl-1,2,3,6-tetrahydropyridine hydrochloride, m.p. 184°–186° C.

EXAMPLE 2

4-methyl-1,2,3,6-tetrahydropyridine

A solution of N-benzyloxy-4-methylpyridinium bromide (5.0 g.) in water (75 ml.) cooled in an ice bath is treated with solid sodium borohydride (1.5 g.) with stirring in several portions over a few minutes. The resultant mixture is stirred for 30 minutes and treated with 6N hydrochloric acid until acid, then ether is added. The ether layer, which contains benzyl alcohol, is removed and the aqueous phase is made basic with 50% sodium hydroxide solution and extracted several times with methylene chloride. The combined methylene chloride extracts are dried over anhydrous sodium sulfate. The extracts are evaporated *in vacuo* and the product 4-methyl-1,2,3,6-tetrahydropyridine recovered as an oil.

What is claimed is:

1. A process for the preparation of a product of the formula

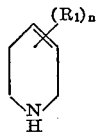

which comprises treating in the lower alcohols, glycols, glyme, di-glyme or water solvent at a temperature of from −15° to 60° C., a salt of a compound of the formula:

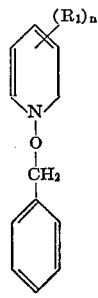

with an alkali metal borohydride where $R_1$ is lower alkyl having 1 to 6 carbon atoms, and $n$ is 0, 1, 2 or 3.

2. A process according to claim 1 wherein said salt is a halide salt.

3. The process according to claim 2 wherein the product is 1,2,3,6-tetrahydropyridine.

4. The process according to claim 2 wherein the product is 2-methyl-1,2,3,6-tetrahydropyridine.

5. The process according to claim 2 wherein the product is 4-methyl-1,2,3,6-tetrahydropyridine.

6. A process according to claim 1 wherein the solvent is water.

References Cited

Anderson et al. Tetrahedron Letters, pp. 153–8 (1964).

Lyle et al., Tetrahedron Letters, pp. 553–7 (1962).

HARRY T. MOATZ, Primary Examiner

U.S. Cl. X.R.

260—296 R; 297 R